(12) United States Patent
Statton et al.

(10) Patent No.: US 10,887,632 B1
(45) Date of Patent: Jan. 5, 2021

(54) DYNAMIC DISTRIBUTION OF ENCODED CONTENT TO MEDIA ENDPOINTS

(71) Applicant: Amazon Technologies, Inc., Seattle, WA (US)

(72) Inventors: Evan Gerald Statton, Denver, CO (US); Saurav Sengupta, Beaverton, OR (US); Bryan Michael Samis, Denver, CO (US)

(73) Assignee: Amazon Technologies, Inc., Seattle, WA (US)

(*) Notice: Subject to any disclaimer, the term of this patent is extended or adjusted under 35 U.S.C. 154(b) by 60 days.

(21) Appl. No.: 15/994,997

(22) Filed: May 31, 2018

(51) Int. Cl.
| | |
|---|---|
| *H04N 21/2343* | (2011.01) |
| *H04N 21/2187* | (2011.01) |
| *G06F 16/23* | (2019.01) |
| *H04N 21/2347* | (2011.01) |
| *H04N 21/472* | (2011.01) |
| *H04L 29/06* | (2006.01) |

(52) U.S. Cl.
CPC ..... *H04N 21/2343* (2013.01); *G06F 16/2379* (2019.01); *H04L 65/4084* (2013.01); *H04N 21/2187* (2013.01); *H04N 21/2347* (2013.01); *H04N 21/47202* (2013.01)

(58) Field of Classification Search
CPC ............ H04N 21/2343; H04N 21/2187; G06F 16/2379
See application file for complete search history.

(56) References Cited

U.S. PATENT DOCUMENTS

| | | | |
|---|---|---|---|
| 2011/0276712 A1* | 11/2011 | Narula | H04L 65/4092 709/231 |
| 2016/0105698 A1* | 4/2016 | Tang | G11B 27/10 725/14 |
| 2017/0329791 A1* | 11/2017 | Manchester | G06F 16/43 |
| 2018/0074890 A1* | 3/2018 | Alnafoosi | G06F 11/1076 |
| 2018/0192080 A1* | 7/2018 | Henaire | H04N 21/2187 |
| 2018/0359529 A1* | 12/2018 | Hasek | H04N 21/6547 |
| 2019/0132630 A1* | 5/2019 | Loheide | H04N 21/26258 |

* cited by examiner

*Primary Examiner* — Michael A Keller
(74) *Attorney, Agent, or Firm* — Knobbe, Martens, Olson & Bear, LLP

(57) ABSTRACT

A video packaging and origination service can include a plurality of media endpoints corresponding to different streaming channels. As encoder encoded content into segments, on-demand code is executed to identify a distribution of a set of media endpoints for individual encoded segments from a record in a database. Individual encoded content segments are distributed based on the distribution information identified in an applicable record in the database.

23 Claims, 13 Drawing Sheets

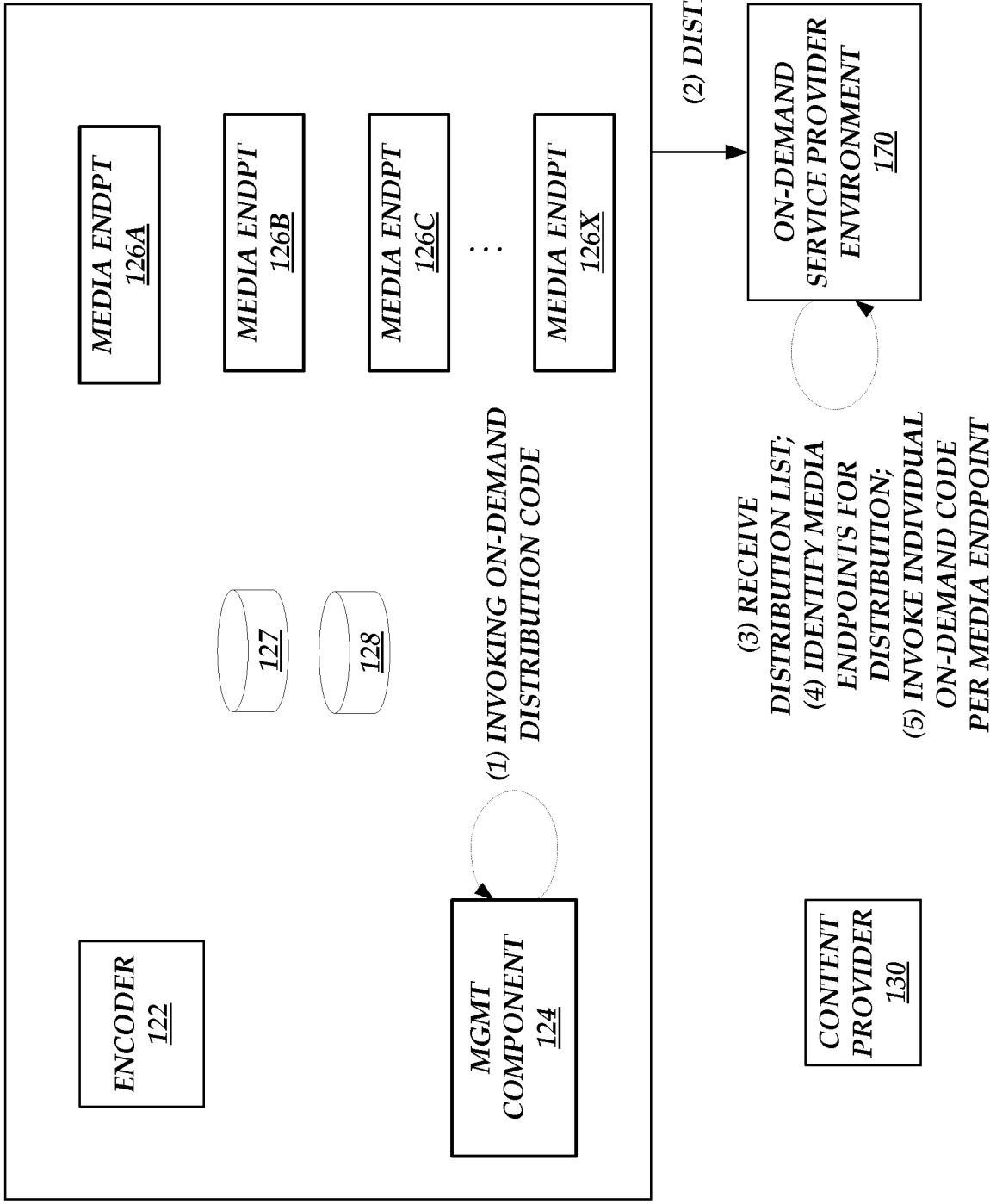

DYNAMIC DISTRIBUTION OF ENCODED CONTENT TO MEDIA ENDPOINTS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of image quality and performance delivery of the requested content as reconstructed at the client computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 6A-6F are block diagrams of the content delivery environment of FIG. 1 illustrating the distribution of encoded content segments utilizing a distribution database and on-demand code in accordance with some embodiments;

DETAILED DESCRIPTION

Figure 1:
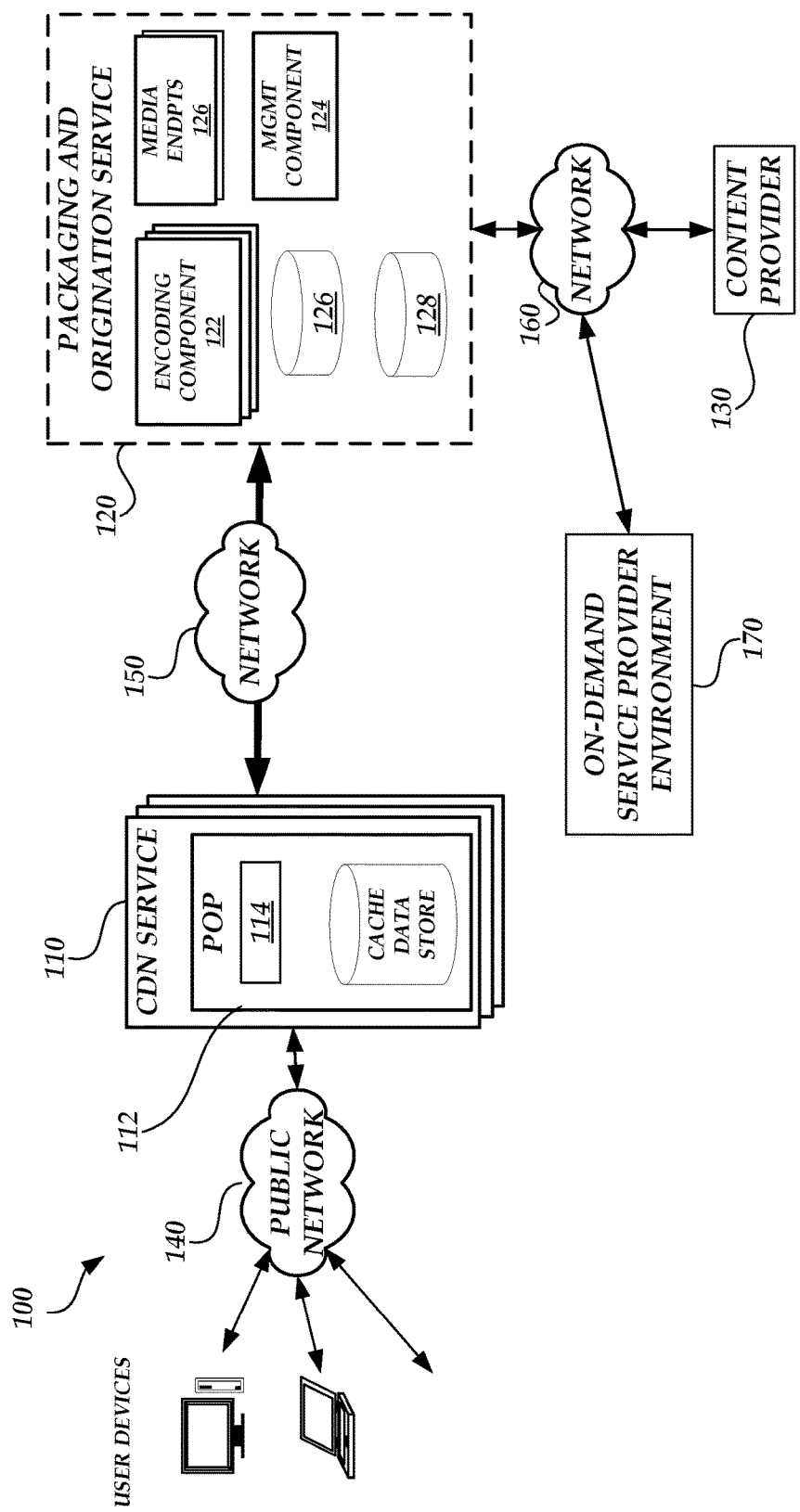
FIG. 1 is a block diagram of a content delivery environment that includes one or more client devices, one or more edge locations, a video packaging system, a content provider and an on-demand service provider in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can distribute encoded content to different user devices or other recipients based geographically-defined or logically-defined criteria generally referred to as distribution zones As applied to encoding content, a video packaging and origination service can set up a set of media endpoints according to different distribution zones to service user devices that belong to, or otherwise are associated with, an identified distribution zone. Respective media endpoints can package and provide encoded segments to requesting users in a distribution zone.

With regard to live streaming of encoded content, a video packaging and origination service can associate various rules or processing restrictions to the set of media endpoints corresponding to different distribution zones. For example, a content provider associated with a sporting event transmission may impose regional restrictions that prohibit transmission of encoded content to certain regions/distribution zones. In another example, a content provider, such as broadcaster, may wish to supersede a scheduled transmission of encoded content to one or more regions, such as a news event. Although video packaging and origination services can be configured to select which media endpoints can receive, or otherwise access encoded content segments for transmission, such approaches are determined a priori and remain fixed. Accordingly, any potential changes to the distribution of encoded content segments typically require a reconfiguration of one or more components of the video packaging and origination service. This creates potential disruptions in the transmission of encoded content segments to the media endpoints, especially for media endpoints in which there is no change whether they receive encoded content segments. Such approaches greatly diminish the number of times a distribution of encoded segments are changed, if at all.

To address at least in part some of the above-described deficiencies associated with traditional encoded content distribution techniques, aspects of the present application correspond to a method and system for managing encoded content segments. More specifically, a video packaging and origination service includes one or more encoders that are configured to encode content according to an encoding profile. Illustratively, the encoders encode the content into a plurality of segments. The encoded content segments can be then transmitted from the encoder to a data store or other storage location and made available to for one or more media endpoints, such as a packager.

In addition to receiving the content to be encoded, the video packaging and origination service receives distribution information identifying the one or more media endpoints that should receive individual encoded content segments or groups of segments. For example, a content provider or other entity can specify the distribution zones, geographically defined areas, or logically-defined areas that should receive the encoded content segment(s). Illustratively, the distribution information specifies the distribution to media endpoints (or regions) on a segment basis or by grouping of segments. The video packaging and origination service can then generate one or more records in a database or other data store that identifies a distribution on a per segment basis. Accordingly, encoded content making up a plurality of encoded segments would have one or more database records (segment per record or multiple segments per record) that apply to multiple encoded content segments.

Responsive to the encoding of content segments by the encoder(s) or storage of an encoded content segment in a data store, the video packaging and origination service invokes on-demand code or other executable code for managing the distribution of individual encoded content segments. As described in greater detail below, the on-demand code or task is hosted by an on-demand service provider. For the individual encoded content segment, the on-demand code obtains a database record applicable to the encoded content segments. Utilizing the database record, the on-demand code then identifies all media endpoints of the video packaging and origination service that will receive the encoded content segment. The on-demand code then further invokes additional on-demand code or other executable code that corresponds to individual on-demand code configured to cause a transmission of the encoded content segment to an identified media endpoint. In embodiments in which a plurality of media endpoints are receiving the encoded segment, a plurality of additional on-demand code is also executed by the on-demand service provider in parallel.

In accordance with aspects of the present application, during the continued transmission of the encoded content segments, the video packaging and origination service can receive or create updated distribution information for one or more of the encoded content segments. For example, a content provider can utilize an application programming interface ("API") to modify or supplement the distribution information, such as by restricting one or more media endpoints from receiving additional encoded content segments or causing additional or alternative media endpoints to begin receiving encoded content segments. Based on the updated or new distribution information, the video packaging and origination service can then generate, replace, or update one or more records in the database or other data store that identifies a distribution on a per segment basis.

As described above, as the encoded content segments are available or otherwise ready for transmission to media endpoints, the video packaging and origination service invokes on-demand code or other executable code for managing the distribution of individual encoded content segments. With regard to updated distribution information, the on-demand code obtains the database record applicable to the encoded content segment with the updated distribution information. Utilizing the database record, the on-demand code then identifies all media endpoints of the video packaging and origination service that will receive the encoded content segment. The on-demand code then further invokes additional on-demand code or other executable code that corresponds to individual on-demand code configured to cause a transmission of the encoded content segment to an identified media endpoint. Utilizing the database records and on-demand code execution, the video packaging and origination service can dynamically adjust the distribution of encoded content segments to various media endpoints. Such dynamic adjust can provide numerous technological benefits including, but not limited to, mitigating the need for reconfiguration of the video packaging and origination service to modify distribution, increasing the efficiency of executing the transmission of encoded content segments as implemented in various components of video packaging and origination service, facilitating the ability to dynamically configure distribution by content providers, the video packaging and origination service or other third parties.

Illustratively, aspects of the present application may utilize the execution of execution of portable segments of code, which can be generally referred to as "on-demand code" or "tasks." The server provider environment may include an on-demand code execution environment that functions to execute the on-demand code or tasks. Further details regarding such an on-demand code execution environment can be found within U.S. patent application Ser. No. 14/502,648, entitled PROGRAMMATIC EVENT DETECTION AND MESSAGE GENERATION FOR REQUESTS TO EXECUTE PROGRAM CODE, filed Sep. 30, 2014, and issued as U.S. Pat. No. 9,323,556 on Apr. 26, 2016 ("the '556 Patent), the entirety of which is hereby incorporated by reference.

In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 Patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 Patent.

In accordance with one or more aspects of the present application, the video packaging and origination service can continue to leverage the benefit of execution of on-demand code and an on-demand code service provider. However, in other embodiments, the video packaging and origination service can utilize additional or alternative executable code that is described above with regard to functionality associated with the on-demand code. Additionally, based aspects of the present application, the video packaging and origination service will be described as facilitating various applications or examples for modifying the distribution of encoded content segments. Such examples are illustrative in nature and should be construed as limiting or exhaustive of all possible applications of one or more aspects of the present application.

FIG. 1 illustrates a general content delivery environment 100 for delivering content from original content providers to user devices. The content delivery environment 100 includes a plurality of devices 102 utilized by individual users, generally referred to as user computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more processing components 114 for processing information for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The content delivery environment 100 can include a plurality of content providers 130 for delivering input signals to the video packaging and origination service 120. The content providers may include one or more servers for delivering content, a data store for maintaining content and a communication manager for facilitating communications to the video packaging and origination service 120 over network° 160. In other embodiments, the content provider 130 can further user devices 120 that are generating live video feeds for transmission by the video packaging and origination service 120. As will be described in detail below, illustratively, the content provider 130 can include or provide multiple, distinct input signals to the video packaging and origination service 120. Additionally, as described above, the content providers 130 can provide distribution information to the video packaging and origination service 120, such as via an API. The content delivery environment 100 can further include an on-demand service provider environment 170 for facilitating the execution of on-demand code or tasks, as will be described in greater detail below.

In accordance with embodiments, the video packaging and origination service 120 includes a set of encoding components 122 for receiving content provided by the content providers 130 (or other source) and processing the content to generate a set of encoded video segments available for delivery. The video packaging and origination service 120 is further optionally associated with a management component 124 to facilitate the determination of distribution of encoded content segments. The management component 124 can delegate at least some portion of the identified functionality to the encoder components themselves, such as the determination or negotiation of the handover or stop events.

The video packaging and origination service 120 can include a plurality of media endpoints 126. Illustratively, the media endpoints 126 can implement functionality associated with packaging and delivery of encoded content segments to user devices 120. Individual media endpoints 126 may be associated with defined geographic or logic areas serviced by the video packaging and origination service 120 and may implemented on different physical computing devices. As will be described in detail below, the video packaging and origination service 120 can vary the distribution of encoded content segments by dynamically modifying how individual encoded content segments are transmitted to a set of media endpoints 126. The video packaging and origination service 120 can further include multiple data stores of maintaining encoded content segments, distribution information or other information utilized in accordance with one or more aspects of the present application or otherwise utilized in the generation of encoded content. Illustratively, the video packaging and origination service 120 includes a data store 127 for receiving and maintaining encoded content segments from the one or more encoders 122. The video packaging and origination service 120 further includes a data store 128 for receiving and maintain distribution information, such as a database in which distribution information for encoded content segments is represented in one or more individual database records.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Additionally, the data stores 127 and 128 may be implemented in a distributed manner that encompasses multiple computing devices geographically or logically distinct. Still further, in some embodiments, the video packaging and origination service 120 may omit a portion, or all, of the functionality associated with interaction service provider environment 170 such as by maintaining executable code or components configured to implement at least a portion of such functionality.

Figure 2:
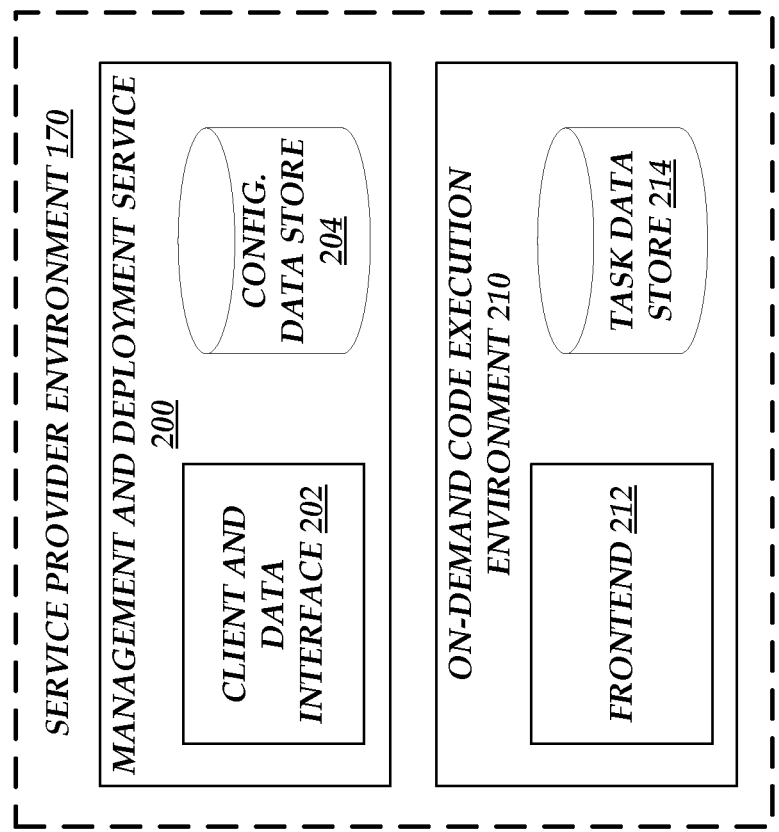
FIG. 2 is a block diagram of illustrative of components of a service provider environment for executing on-demand code in accordance with some embodiments.

Turning now to FIG. 2, an illustrative service provider environment 170 for the execution of on-demand code or tasks will be described. The service provider environment 170 can include a number of elements to enable configuration of, management of, and communications with the video packaging and origination service 120. Specifically, the service provider environment 170 includes a management and deployment service 200 to enable interaction with the video packaging and origination service 120, and an on-demand code execution environment 210 providing on-demand, dynamic execution of tasks.

As shown in FIG. 2, the management and deployment service 200 includes a client and data interface 202 and a configuration data store 204 that may operate collectively to enable registration of the video packaging and origination service 120. Illustratively, the client and data interface 202 may provide one or more user interfaces (e.g., APIs, CLIs, GUIs, etc.) through which the video packaging and origination service 120, may generate or submit a configuration of on-demand executable code as described herein. The configuration data store 204 can correspond to any persistent or substantially persistent data store, such as a hard drive (HDD), a solid state drive (SDD), network attached storage (NAS), a tape drive, or any combination thereof.

In some embodiments, the on-demand code execution environment 170 may include multiple edge locations from which a user device can retrieve content. Individual edge locations may be implemented in one or more POPs. As described with regard to the CDN service provider, POPs are generally associated with a specific geographic location in which the computing devices implementing the POP are located, or with a region serviced by the POP. Illustratively, individual POPs can include one or more information processing components for providing on-demand execution of tasks (e.g., portable code segments). In some instances, the POPs may implement one or more services, such as CDN services, data storage services, data processing services, etc. The CDN service provider 110 may include multiple POPs located in different geographic locations so that components of the video packaging and origination service 120 can communicate with a logically proximate POP to transmit requests for authentication and authorization and receive processing results.

The on-demand code execution environment 210 can include a number of devices providing on-demand execution of tasks (e.g., portable code segments). Specifically, the on-demand code execution environment 210 can include a frontend 212, through which computing devices, may submit tasks to the on-demand code execution environment 210 and call for execution of tasks on the on-demand code execution environment 210. Such tasks may be stored, for example, in a task data store 214, which can correspond to any persistent or substantially persistent data store, such as a hard drive (HDD), a solid state drive (SDD), network attached storage (NAS), a tape drive, or any combination thereof. While not shown in FIG. 2, the on-demand code execution system 210 can include a variety of additional components to enable execution of tasks, such as a number of execution environments (e.g., containers or virtual machines executing on physical host devices of the on-demand code execution environment 210), a worker manager to manage such execution environments, and a warming pool manager to assist in making execution environments available to the worker manager on a rapid basis (e.g., under 10 ms). Further details regarding the on-demand code execution environment can be found within the '556 Patent, incorporated by reference above.

As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 210 in a variety of manners. In one embodiment, a computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 214) prior to the request being received by the on-demand code execution system 150. A request interface of the on-demand code execution system 210 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface of the frontend 212.

A call to execute a task may specify one or more third-party libraries (including native libraries) to be used along with the user code corresponding to the task. In one embodiment, the call may provide to the on-demand code execution system 210 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 210 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 210 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 210 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 210 may inspect the call and look for the flag or the header, and if it is present, the on-demand code execution system 210 may modify the behavior (e.g., logging facilities) of the execution environment in which the task is executed, and cause the output data to be provided back to the user. In some embodiments, the behavior/mode indicators are added to the call by the user interface provided to the user by the on-demand code execution system 210. Other features such as source code profiling, remote debugging, etc. may also be enabled or disabled based on the indication provided in a call.

Figure 3:
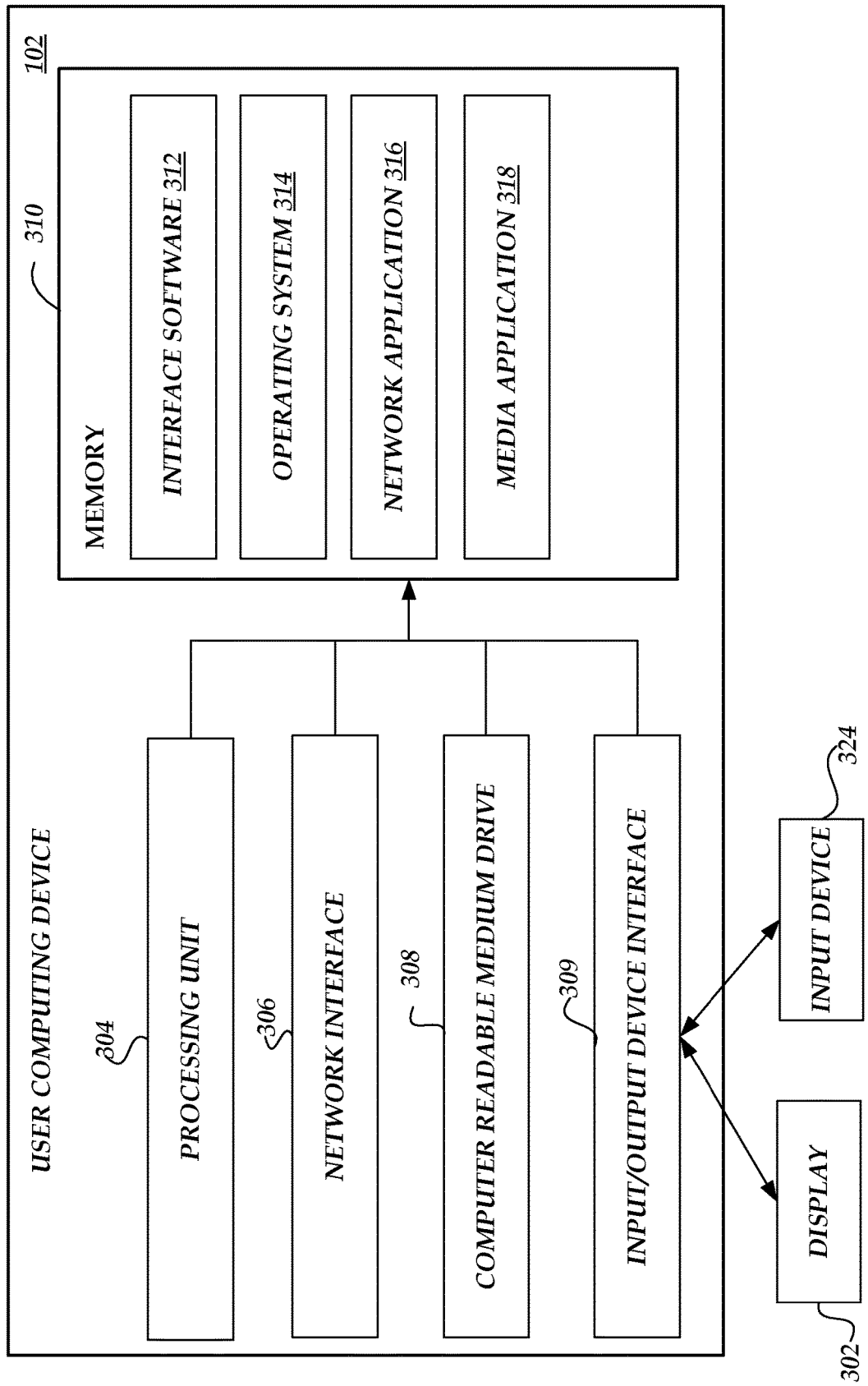
FIG. 3 is a block diagram illustrative of components of user device for requesting and receiving encoded content in accordance with some embodiments.

FIG. 3 depicts one embodiment of an architecture of an illustrative user computing device 102 that can generate content requests and process metric information in accordance with the present application. The general architecture of the user computing device 102 depicted in FIG. 3 includes an arrangement of computer hardware and software components that may be used to implement aspects of the present disclosure. As illustrated, the user computing device 102 includes a processing unit 304, a network interface 306, an input/output device interface 309, an optional display 302, and an input device 324, all of which may communicate with one another by way of a communication bus.

The network interface 306 may provide connectivity to one or more networks or computing systems, such as the network 140 of FIG. 1 and the video packaging and origination service 120 or the content provider 130. The processing unit 304 may thus receive information and instructions from other computing systems or services via a network. The processing unit 304 may also communicate to and from memory 310 and further provide output information for an optional display 302 via the input/output device interface 309. The input/output device interface 309 may also accept input from the optional input device 324, such as a keyboard, mouse, digital pen, etc. In some embodiments, the user computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes interface software 312 for requesting and receiving content from the video packaging and origination service 120 via the CDN service provider 110. In another example, in one embodiment, the memory 310 includes a specific media player application for accessing content, decoding the encoded content, and communicating with the CDN service provider 110.

Figure 4:
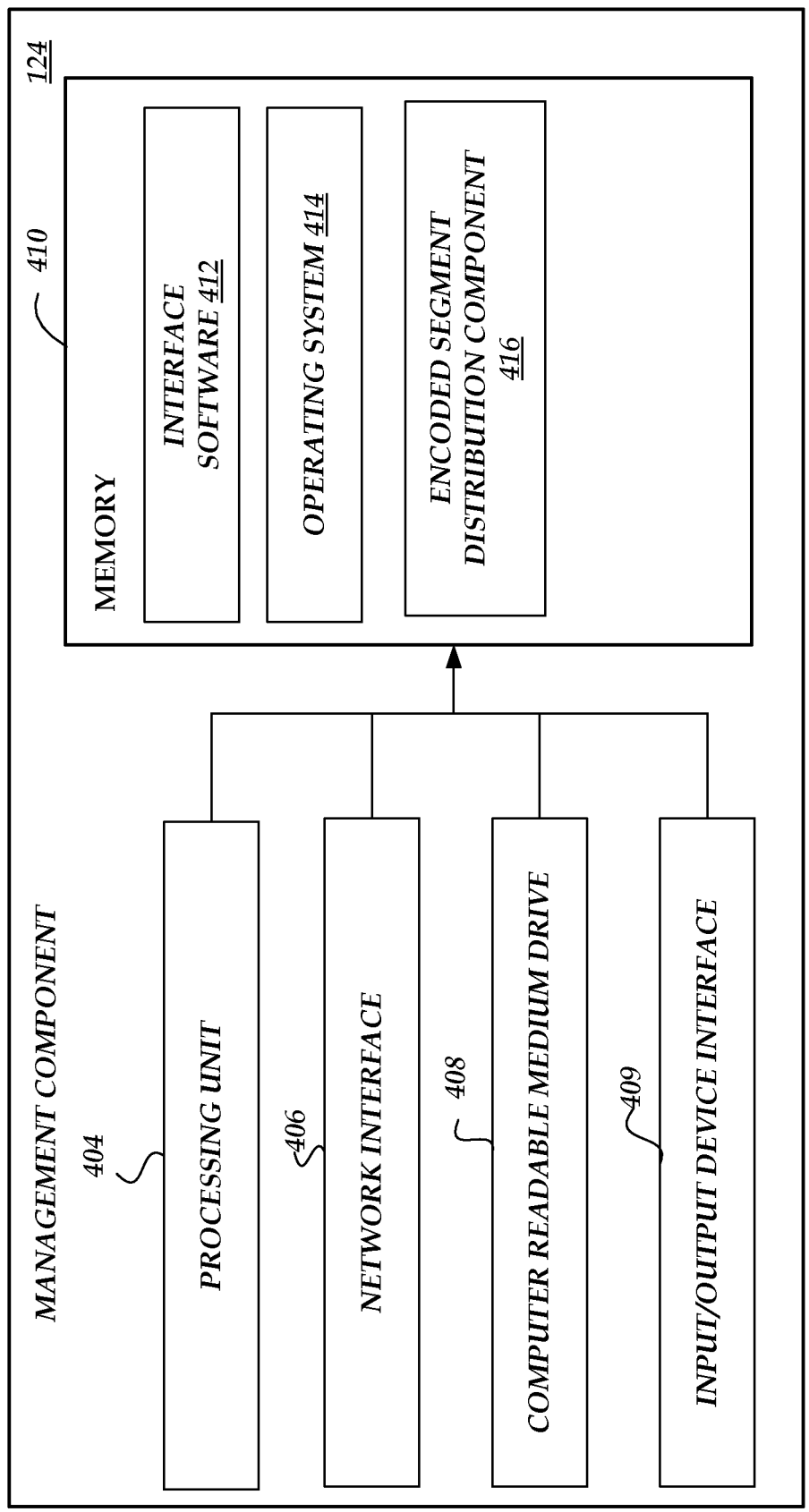
FIG. 4 is a block diagram illustrative of components of a management component of a video packing and origination service for managing the distribution of encoded content segments in accordance with some embodiments.

FIG. 4 depicts one embodiment of an architecture of an illustrative computing device for implementing encoded content distribution routine described herein. The computing device 400 can be a part of the video packaging and origination service 120, such as a management component 124. Alternatively, the computing device may a stand-alone device independent of the video packaging and origination service 120 or as part of a service/service provider also independent of the video packaging and origination service 120.

The general architecture of the computing device 400 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 400. The memory 410 may further include computer program instructions and other information for implementing aspects of the present disclosure. For example, in one embodiment, the memory 410 includes interface software 412 for receiving and processing content streams. Memory 410 includes an encoded segment distribution component 416 for managing the interactions between encoder components 122, media endpoints 126 and the on-demand service provider environment 170. The encoded segment distribution component 416 further facilitates receipt and processing of distribution configurations from computing devices, such as computing devices associated with a content provider 130.

As specified above, in one embodiment, the computing device 400 illustrated in FIG. 4 can be implemented as physical computing devices or virtualized computing devices in a computing network. In another embodiment, the computing device 400 may be implemented as logical components in a virtual computing network in which the functionality of the computing device 400 is implemented by an underlying substrate network of physical computing devices. In this embodiment, the computing device 400 may not be actually instantiated in the physical computing devices of the substrate network. Accordingly, reference to instantiation of a computing device 400 to carry out a desired function can correspond to a configuration of physical computing devices functioning as the computing device 400, instantiation of virtualized computing devices functioning as the computing device or instantiation of logical components in a virtualized network. In each of these examples, the creation, configuration and implementation of the components and the interactions described herein would vary according to the specific instantiation of the computing device 400. Thus, aspects of the present application should not be limited to interpretation requiring a physical, virtual or logical embodiment unless specifically indicated as such.

Figure 5:
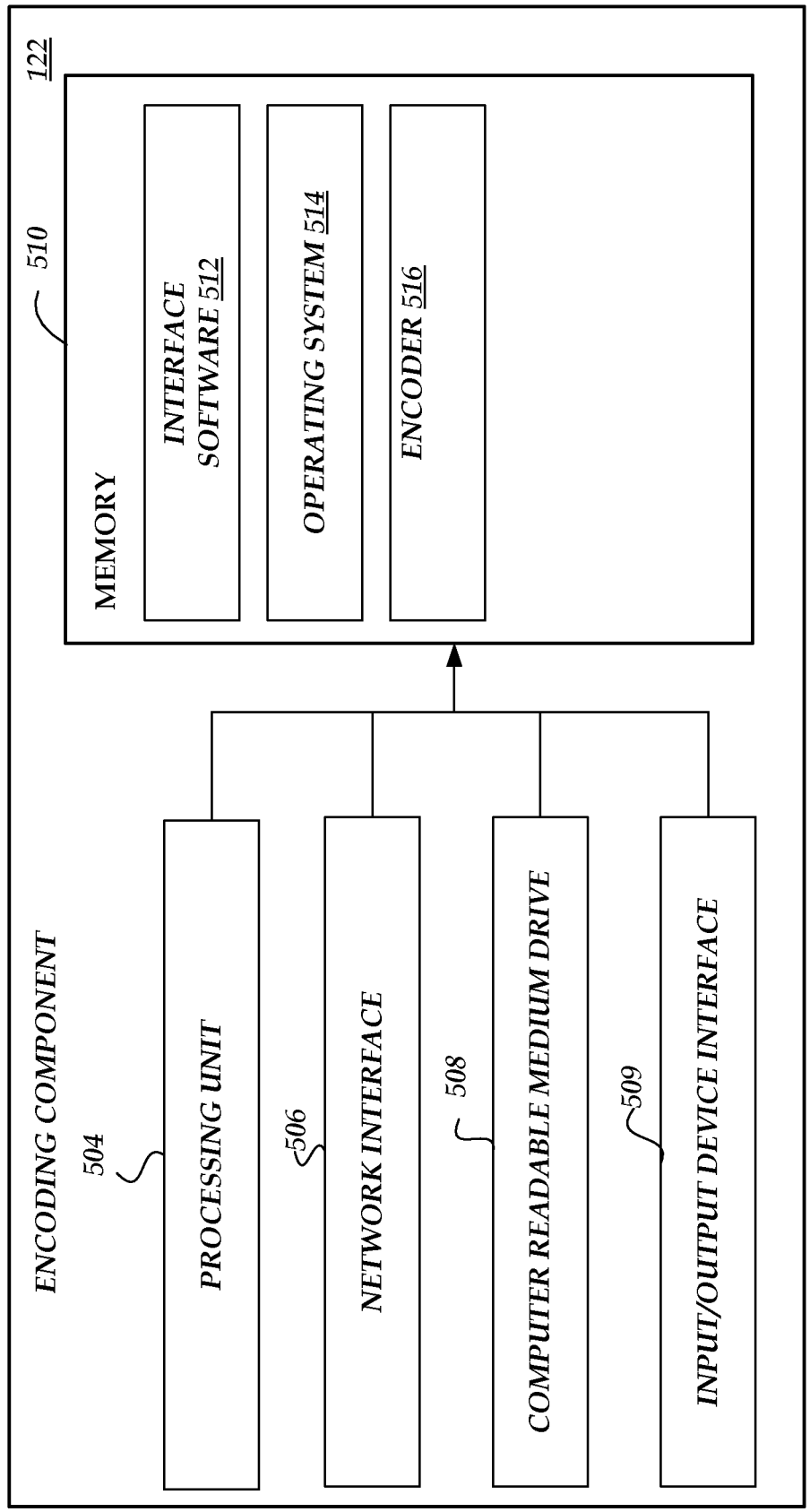
FIG. 5 is a block diagram of illustrative of components of an encoder of a packaging and origination service configured to manage content encoding by synchronizing according to exchanged picture data in accordance with some embodiments.

FIG. 5 depicts one embodiment of an architecture of an illustrative encoding component 122 for implementing the video packaging and origination service 120 described herein. The general architecture of the encoding component 122 depicted in FIG. 5 includes an arrangement of computer hardware and software components that may be used to implement aspects of the present disclosure. As illustrated, the encoding component 122 of the video packaging and origination service 120 includes a processing unit 504, a network interface 506, a computer readable medium drive 508, an input/output device interface 509, all of which may communicate with one another by way of a communication bus. The components of the encoding component 122 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the encoding component 122 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the video packaging and origination service 120. The memory 510 may further include computer program instructions and other information for implementing aspects of the present disclosure. For example, in one embodiment, the memory 510 includes interface software 512 for receiving and processing content requests from user devices 102. Memory 510 includes an encoder 516 for encoding video segments to be sent to user devices 102 in response to content requests.

As specified above, in one embodiment, the encoder components 122 illustrated in FIG. 5 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Turning now to FIGS. 6A-6F, an illustrative interaction for the distribution of encoded segments generated by one or more encoder components 122 to a plurality of media endpoints 126 will be described. For purposes of illustration, FIG. 6A-6F illustrates interaction between a single encoder 122 of the video packaging and origination service 120, one content provider 130, and four representative media endpoints 126A-126X. Each of the media endpoints 126A-126X correspond to at least two different distribution zones (geographically or logically defined). Such interaction is representative in nature and could include a number of additional components or interactions. Additionally, although logically represented as components within the video packaging and origination service 120, the components may be implemented in different geographic areas and on physical computing devices. The interaction of FIG. 6A-6F illustratively occurs after the video packaging and origination service 120 has received a requesting entity requests for streaming content and configured the video packaging and origination service for transmission.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

Figure 6A:
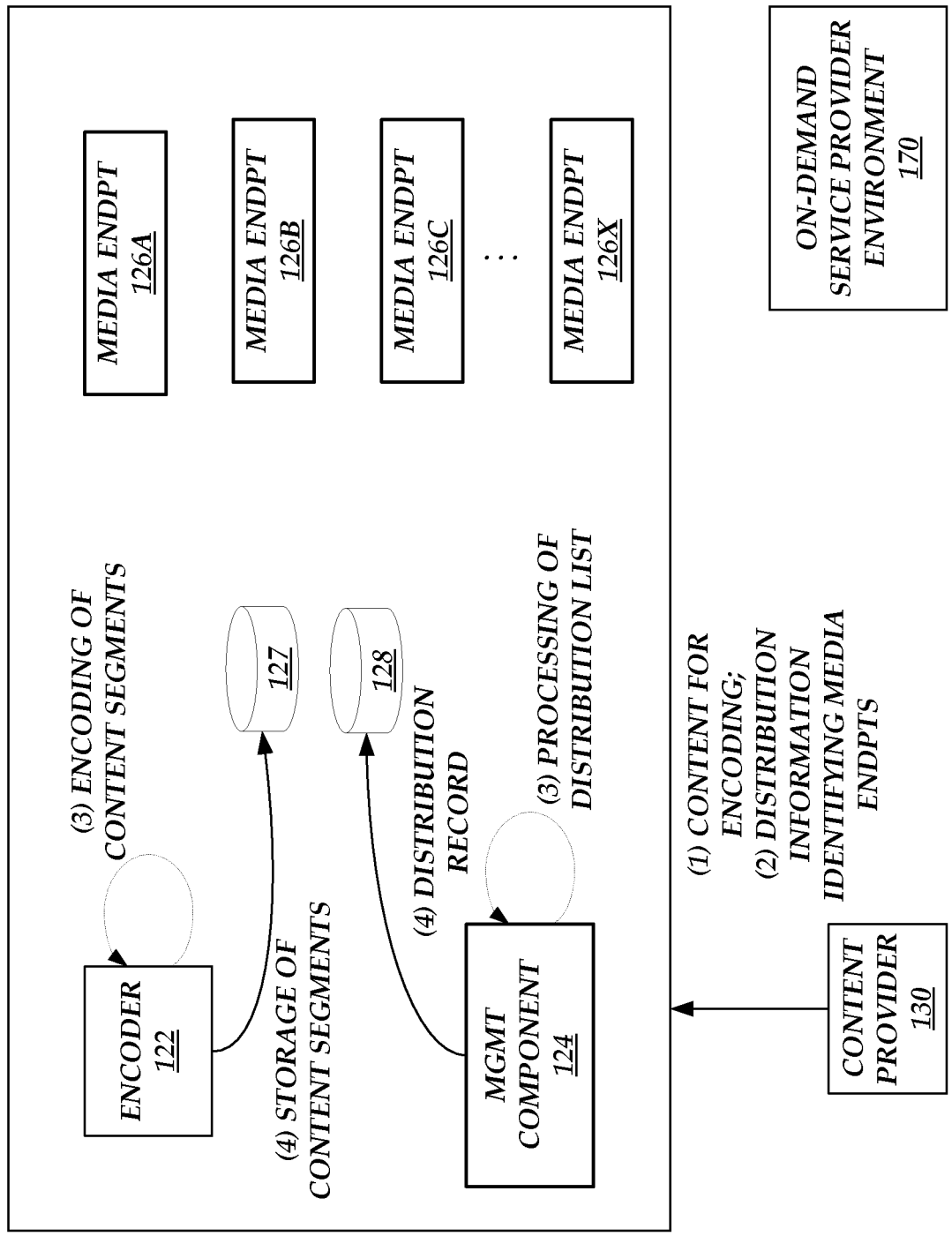

With reference to FIG. 6A, the processing of distribution information and encoding of content will be illustrated as occurring substantially in parallel. Such parallel occurrence is illustrative in nature and illustrates to independent activities. At (1), the content provider transmits content to be encoded to the video packaging and origination service 120. Illustratively, the content provider 130 can encoded the content according to an encoding profile and stream the content to the video packaging and origination service 120. The video packaging and origination service 120 can process the encoded content into a form ready for encoding by the video packaging and origination service 120.

At (2), the content provider 130 transmits distribution information for use in identification of a set of media endpoints that will receive one or more of the encoded content segments. The distribution information can be in the form of the specific identification of media endpoints 126 that will receive each individual encoded content segment. In other embodiments, the distribution information can be in the form of specific identification of media endpoints that will receive encoded content and that can be further processed by the video packaging and origination service 120 according to encoded content segment (e.g., a media endpoint is authorized or configured to receive all or a portion of encoded segments). In still other embodiments, the distribution information can be in the form of attributes or criteria that facilitates a subsequent selection of media endpoints 126 that should receive encoded content segments, a determination of which encoded segments individual media endpoints 126 should receive, or a combination. The form for the transmission of the distribution information can be specified by the video packaging and origination service 120 according to an API or other interface.

At (3), the video packaging and origination service 120, such as through the management component 124, processes the distribution information to identify the media endpoints that will be associated with one or more encoded content segments. As described above, the distribution information can be provided in various formats. Accordingly, the processing of the distribution information can illustratively include parsing the submitted distribution information, obtaining required additional information, or conducting additional analysis/processing. At (4), the management component 124 generates and stores one or more distribution records for the data store 128. In one embodiment, the data store 128 includes a record that applies to multiple encoded content segments. The record identifies media endpoints that will receive the encoded content segment. In another embodiment, the data store 128 includes a record for each individual encoded content segment that identifies media endpoints that will receive the encoded content segment. Still further, in other embodiments, the data store 128 includes multiple records that apply to encoded content segments. Individual records may specify different or alternative distribution for the encoded content segments. Accordingly, the records include or are associated with selection criteria that allows the video packaging and origination service 120 to determine which distribution information will apply.

In parallel with the above (3) and (4), at (3), the encoder 122 encodes the content according to one or more encoding profiles (e.g., combinations of encoding bitrate and format) in accordance with the selected alignment information. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Accordingly, at (4), the encoder transmits the encoded segment or segments to the data store 127. The data store 127 may be configured as a central repository or control for receiving encoded content segments and becoming the source for transmission of the encoded content segment to multiple media endpoints 126.

Turning now to FIG. 6B, an illustrative interaction for the processing the distribution information by invocation of the on-demand code will be described. At (1), the video packaging and origination service 120, such through the management component 124, invokes on-demand distribution code. Illustratively, the management component 124 can invoke individual task or execution of on-demand code to effect the transmission of a single encoded segment to an identified set of media endpoints 126. The invocation of the on-demand code can be responsive to the completion of the encoding process, the transmission of an encoded content segment to a storage location 127, or responsive to other established criteria. The on-demand code can be invoked for a single processing in a manner to make dynamic management of distribution more efficient, although it may not necessarily be required. The invocation of the on-demand code will be illustrative managed by the on-demand service provider environment 170.

At (2), the video packaging and origination service 120 transmits or otherwise makes available the distribution list applying to the encoded segment that is the subject of the on-demand code. For example, the on-demand service provider environment 170 can access or receive individual database records (or information from the individual record). Such transmission/distribution can be facilitated as part of the call to invoke the on-demand code or as a separate communication. At (3), the on-demand service provider environment 170 receives the distribution list.

At (4), the on-demand service provider environment, executing the on-demand code, identifies the set of media endpoints for distribution of the encoded content segment. Illustratively, the distribution information includes identification information and any other required information for facilitating the transmission of encoded content segments from the storage location 127 to a respective media endpoint 126.

At (5), the on-demand service provider environment 170, executes the on-demand code (e.g., the first on-demand code), then invokes additional on-demand code to cause a transmission of stored, encoded content segment to each media endpoint 126 in the identified set of media endpoints. Illustratively, the on-demand service provider environment 170 invokes an instance of additional (or second) on-demand for every identified media endpoint 126. Such set of additional on-demand code may be executed substantially in parallel but in a manner such that each transmission is considered a separate transmission. Accordingly, such transmissions may be considered to not depend on the success or completion of another transmission.

Figure 6C:
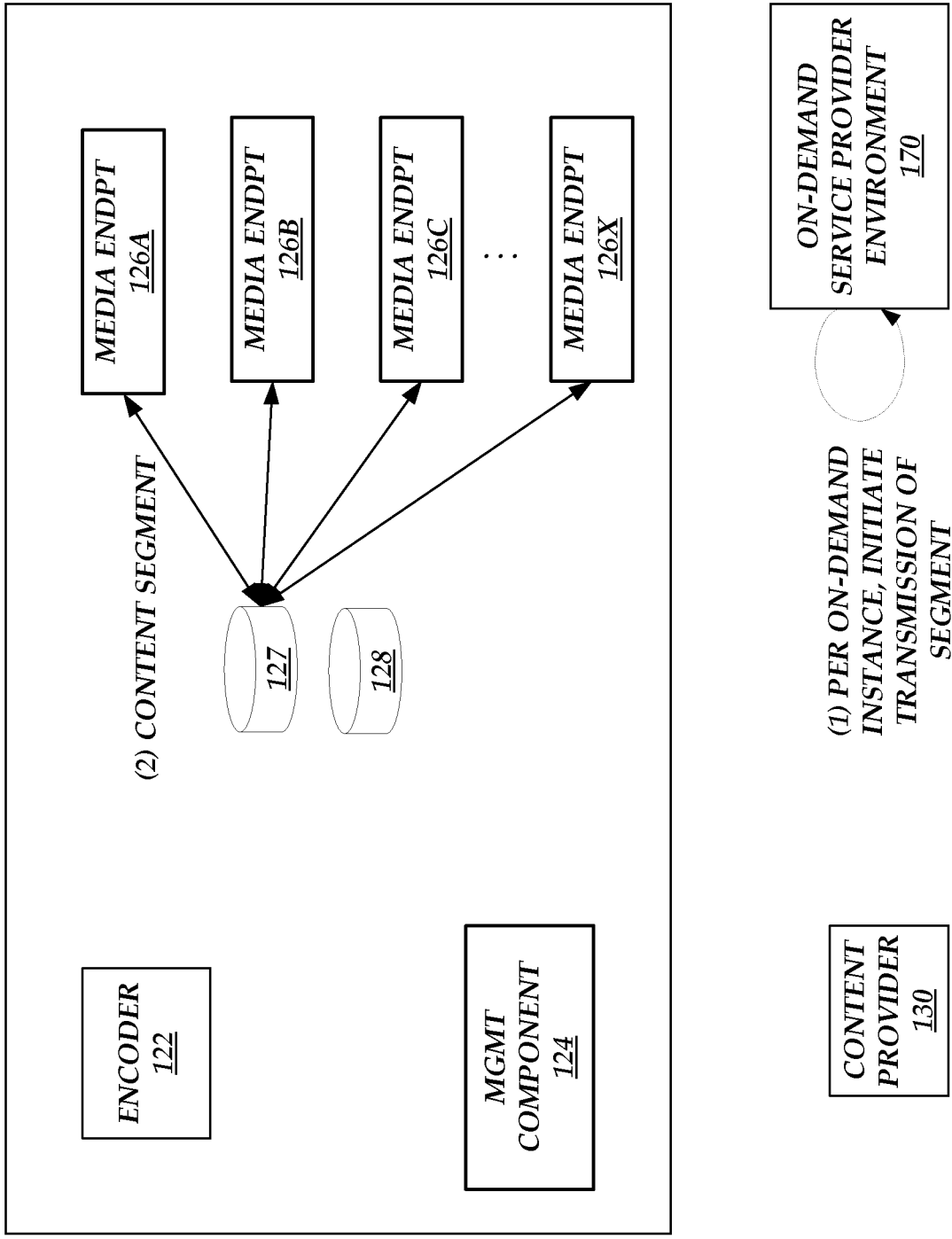

Turning now to FIG. 6C, an illustrative interaction for the processing the distribution information by invocation of the additional on-demand code will be described. At (1), the on-demand service provider environment, executing multiple instances of the additional on-demand code, initiates and manages the transmission of stored, encoded content segment to each media endpoint 126 in the identified set of media endpoints. As described above, the on-demand service provider environment 170 invokes an instance of additional (or second) on-demand for every identified media endpoint 126. Such set of additional on-demand code may be executed substantially in parallel but in a manner such that each transmission is considered a separate transmission. Accordingly, such transmissions may be considered to not depend on the success or completion of another transmission. At (2), the stored on-demand code is transmitted to each respective media endpoint 126. As illustrated in FIG. 6C, media endpoints 126A, 126B, 126C and 126X receive the encoded content segment. The respective media endpoints 126 then further process the encoded content segments for transmission to the user devices 102.

Figure 6D:
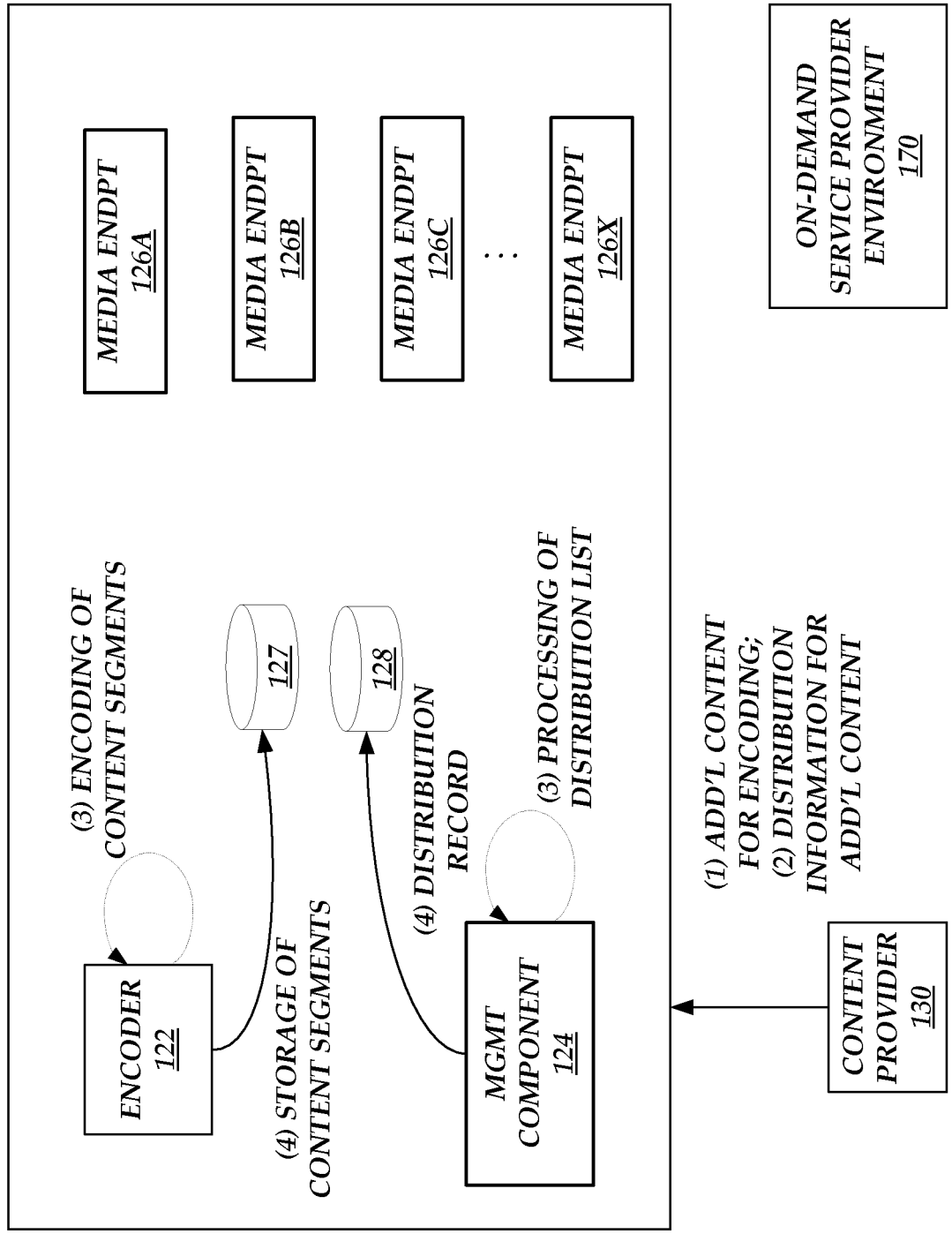
Figure 6E:
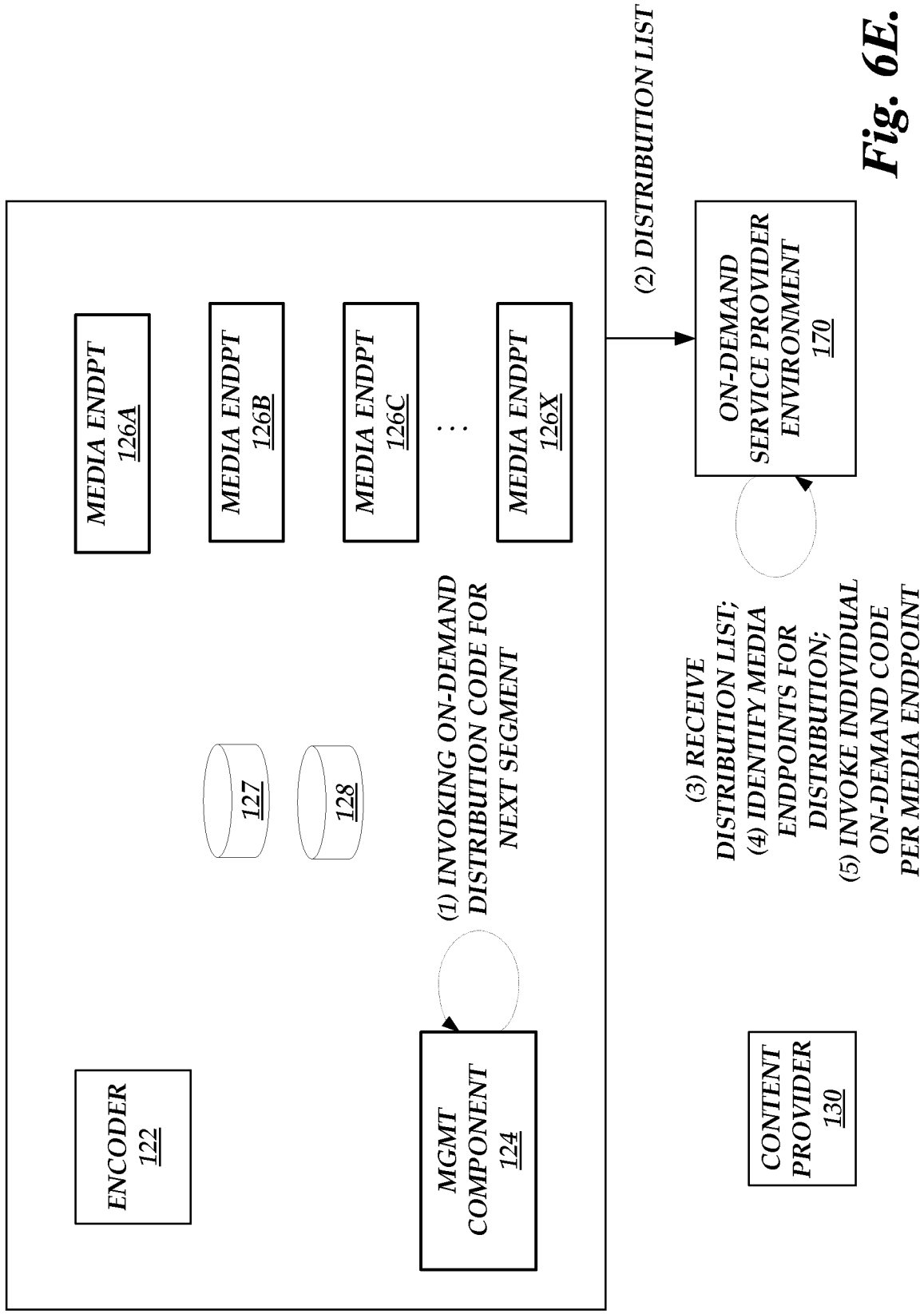
Figure 6F:
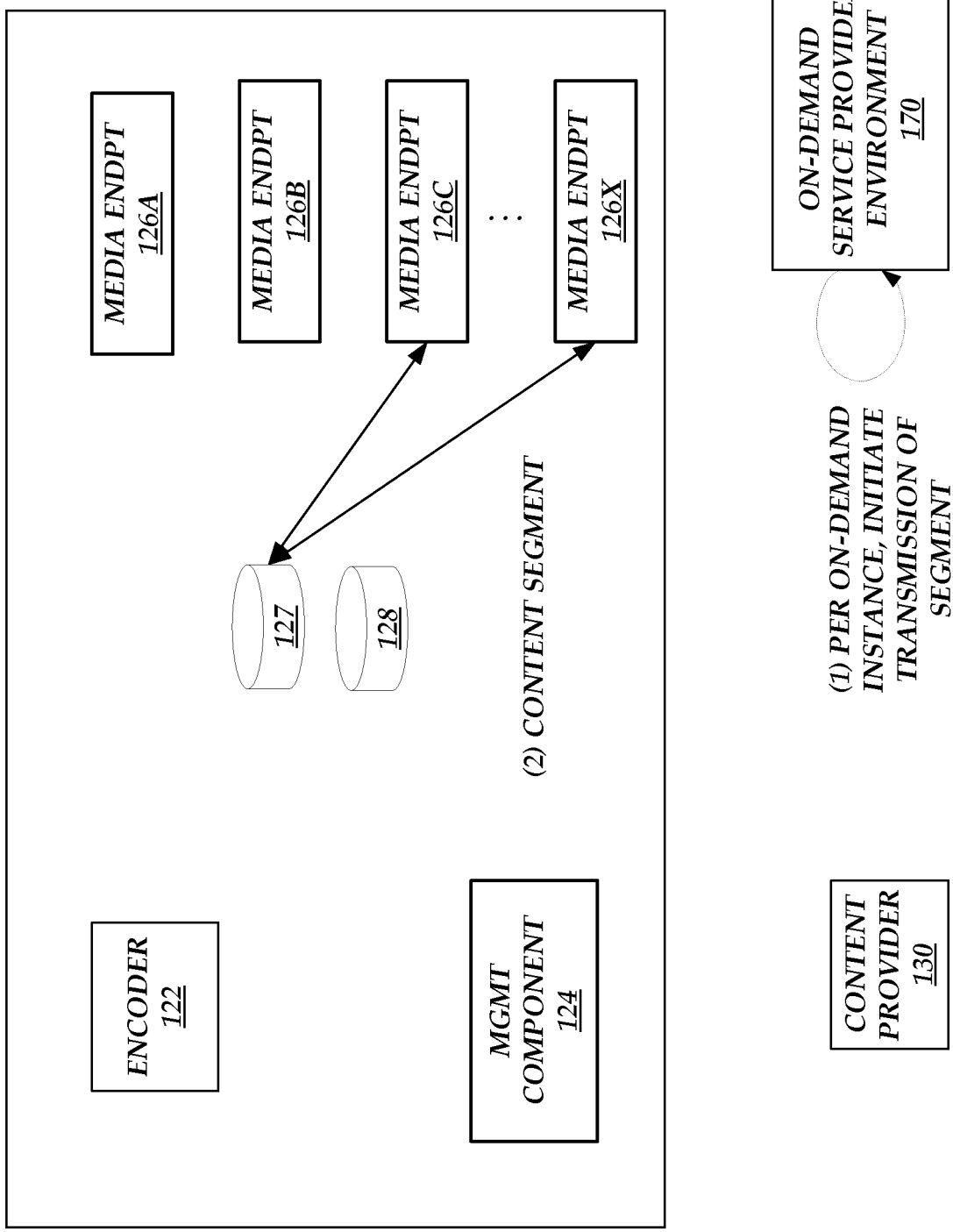

With reference now to FIGS. 6D-6F, additional illustrative interaction for the dynamic processing of subsequent encoded content segments will be described. With reference to FIG. 6D, the processing of updated distribution information and continued encoding of content will be illustrated as occurring substantially in parallel. Such parallel occurrence is illustrative in nature and illustrates to independent activities. At (1), the content provider transmits content to be encoded to the video packaging and origination service 120. Illustratively, the content provider 130 can encoded the content according to an encoding profile and stream the content to the video packaging and origination service 120. The video packaging and origination service 120 can process the encoded content into a form ready for encoding by the video packaging and origination service 120. In some embodiments, the content provider 130 may have already transmitted the content for encoding and may only be transmitting updated distribution information.

At (2), the content provider 130 transmits updated distribution information for use in identification of a set of media endpoints that will receive subsequent encoded content segments. As described above, the distribution information can be in the form of the specific identification of media endpoints 126 that will receive each individual encoded content segment. In other embodiments, the distribution information can be in the form of specific identification of media endpoints that will receive encoded content and that can be further processed by the video packaging and origination service 120 according to encoded content segment (e.g., a media endpoint is authorized or configured to receive all or a portion of encoded segments). In still other embodiments, the distribution information can be in the form of attributes or criteria that facilitates a subsequent selection of media endpoints 126 that should receive encoded content segments, a determination of which encoded segments individual media endpoints 126 should receive, or a combination. The form for the transmission of the distribution information can be specified by the video packaging and origination service 120 according to an API or other interface. For purposes of illustration, the updated distribution information may be based on changes in programming criteria, such as regional programming, emergency programming changes, expiration of time or financial criteria, and the like.

At (3), the video packaging and origination service 120, such as through the management component 124, processes the updated distribution information to identify the media endpoints that will be associated with one or more encoded content segments. As described above, the distribution information can be provided in various formats. Accordingly, the processing of the distribution information can illustratively include parsing the submitted distribution information, obtaining required additional information, or conducting additional analysis/processing. At (4), the management component 124 generates and stores one or more distribution records for the data store 128 corresponding to the updated distribution information for the subsequently encoded content segment. As described above, the data store 128 includes one or more records that identifies media endpoints that will receive encoded content segments. The management component 124 may overwrite previous records that have been updated or replaced. Alternatively, the management component 124 may keep previous records as historical information and designate the one or more records including the updated distribution information as the current or valid database records.

In some embodiments, in parallel with the above (3) and (4), at (3), the encoder 122 encodes additional content segments according to one or more encoding profiles (e.g., combinations of encoding bitrate and format) in accordance with the selected alignment information. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Accordingly, at (4), the encoder transmits the encoded segment or segments to the data store 127. The data store 127 may be configured as a central repository or control for receiving encoded content segments and becoming the source for transmission of the encoded content segment to multiple media endpoints 126.

Turning now to FIG. 6E, illustrative interaction for the processing the updated distribution information by invocation of on-demand code will be described. At (1), the video packaging and origination service 120, such through the management component 124, invokes on-demand distribution code. As described above, the management component 124 can invoke individual task or execution of on-demand code to effect the transmission of a single encoded segment to an identified set of media endpoints 126. Accordingly, the invocation of the on-demand code as illustrated in FIG. 6B would be a different instance of the on-demand code illustrated in FIG. 6E. The invocation of the on-demand code can be responsive to the completion of the encoding process, the transmission of an encoded content segment to a storage location 127, or responsive to other established criteria. The on-demand code can be invoked for a single processing in a manner to make dynamic management of distribution more efficient, although it may not necessarily be required. The invocation of the on-demand code will be illustrative managed by the on-demand service provider environment 170.

At (2), the video packaging and origination service 120 transmits or otherwise makes available the distribution list applying to the encoded segment that is the subject of the on-demand code. For example, the on-demand service provider environment 170 can access or receive individual database records (or information from the individual record). Such transmission/distribution can be facilitated as part of the call to invoke the on-demand code or as a separate communication. At (3), the on-demand service provider environment 170 receives the updated distribution list.

At (4), the on-demand service provider environment, executing the on-demand code, identifies the set of media endpoints for distribution of the encoded content segment. Illustratively, the distribution information includes identification information and any other required information for facilitating the transmission of encoded content segments from the storage location 127 to a respective media endpoint 126.

At (5), the on-demand service provider environment 170, executes the on-demand code (e.g., the first on-demand code), then invokes additional on-demand code to cause a transmission of stored, encoded content segment to each media endpoint 126 in the identified set of media endpoints. Illustratively, the on-demand service provider environment 170 invokes an instance of additional (or second) on-demand for every identified media endpoint 126. Such set of additional on-demand code may be executed substantially in parallel but in a manner such that each transmission is considered a separate transmission. Accordingly, such transmissions may be considered to not depend on the success or completion of another transmission.

Turning now to FIG. 6F, an illustrative interaction for the processing the distribution information by invocation of the additional on-demand code will be described. At (1), the on-demand service provider environment, executing multiple instances of the additional on-demand code, initiates and manages the transmission of stored, encoded content segment to each media endpoint 126 in the identified set of media endpoints. As described above, the on-demand service provider environment 170 invokes an instance of additional (or second) on-demand for every identified media endpoint 126. Such set of additional on-demand code may be executed substantially in parallel but in a manner such that each transmission is considered a separate transmission. Accordingly, such transmissions may be considered to not depend on the success or completion of another transmission. At (2), the stored on-demand code is transmitted to each respective media endpoint 126. As illustrated in FIG. 6C, media endpoints 126C and 126X receive the next encoded content segment. Additionally, in the updated distribution list, media endpoints 126A and 126B do not receive the next encoded segment. The respective media endpoints 126 then further process the encoded content segments for transmission to the user devices 102.

Figure 7:
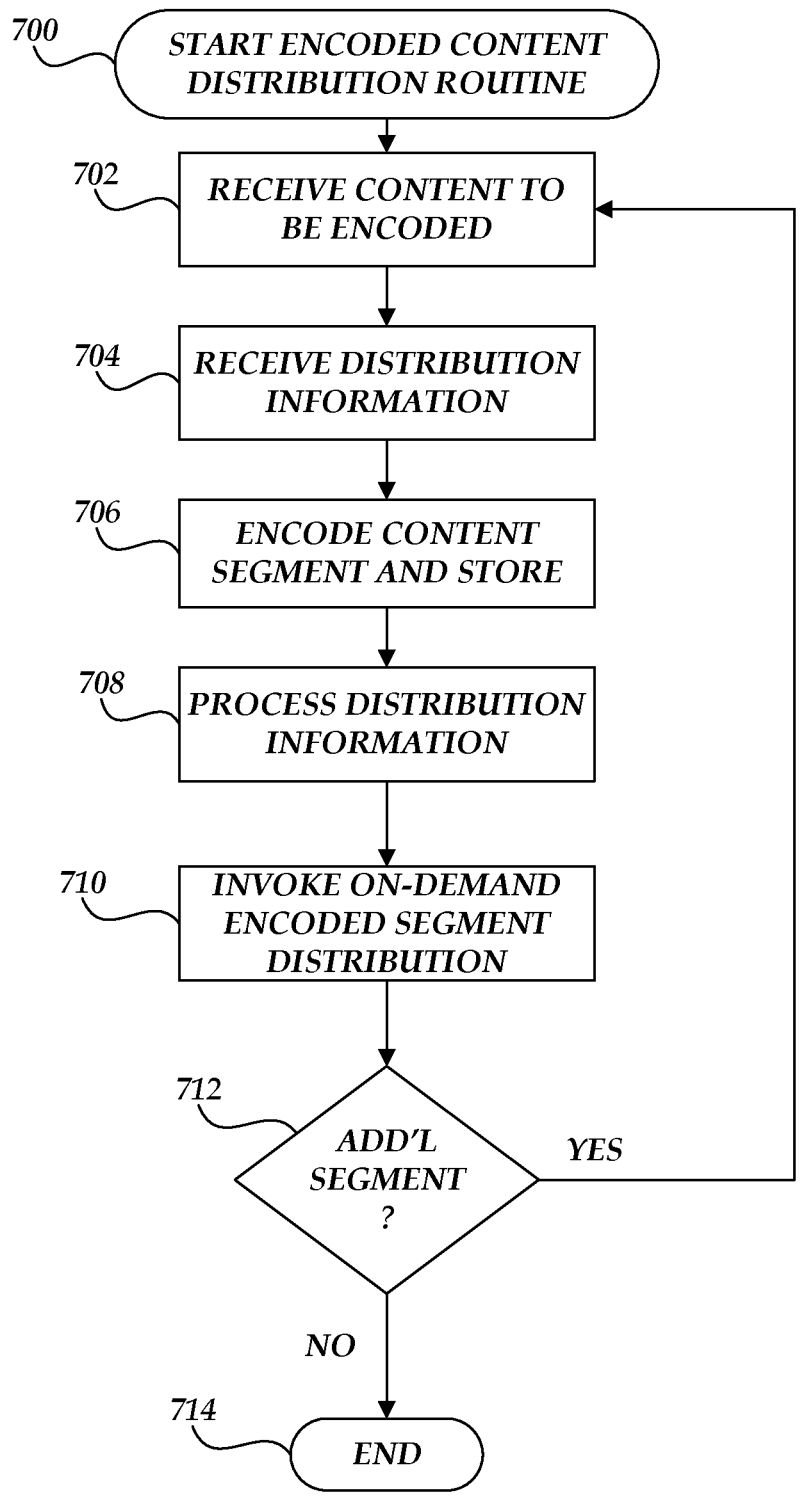
FIG. 7 is a flow diagram illustrative of an encoded content distribution routine implemented by a video packaging and origination system in accordance with some embodiments.

Turning now to FIG. 7, a routine 700 for implementing encoded content distribution routine will be described. Illustratively, routine 700 will be described with regard to implementation by a computing devices, such as the management component 124 of the video packaging and origination service 120 as described herein. At block 702, the video packaging and origination service 120 receives content to be encoded. Illustratively, the content provider 130 can encoded the content according to an encoding profile and stream the content to the video packaging and origination service 120. The video packaging and origination service 120 can process the encoded content into a form ready for encoding by the video packaging and origination service 120.

At block 704, the video packaging and origination service 120 receives distribution information for use in identification of a set of media endpoints that will receive one or more of the encoded content segments. The distribution information can be in the form of the specific identification of media endpoints 126 that will receive each individual encoded content segment. In other embodiments, the distribution information can be in the form of specific identification of media endpoints that will receive encoded content and that can be further processed by the video packaging and origination service 120 according to encoded content segment (e.g., a media endpoint is authorized or configured to receive all or a portion of encoded segments). In still other embodiments, the distribution information can be in the form of attributes or criteria that facilitates a subsequent selection of media endpoints 126 that should receive encoded content segments, a determination of which encoded segments individual media endpoints 126 should receive, or a combination. The form for the transmission of the distribution information can be specified by the video packaging and origination service 120 according to an API or other interface.

At block 706, the encoder 122 encodes the content according to one or more encoding profiles (e.g., combinations of encoding bitrate and format) in accordance with the selected alignment information. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Additionally, the video packaging and origination service 120 transmits the encoded segment or segments to the data store 127. The data store 127 may be configured as a central repository or control for receiving encoded content segments and becoming the source for transmission of the encoded content segment to multiple media endpoints 126.

At block 708, the video packaging and origination service 120 processes the distribution information to identify the media endpoints that will be associated with one or more encoded content segments. As described above, the distribution information can be provided in various formats. Accordingly, the processing of the distribution information can illustratively include parsing the submitted distribution information, obtaining required additional information, or conducting additional analysis/processing. As part of block 708, the management component 124 generates and stores one or more distribution records for the data store 128. Illustratively, the data store 128 includes one or more records that identifies media endpoints that will receive the encoded content segment. Illustratively, a single record may correspond to multiple encoded content segments. It may be possible in other embodiments that a single record can a single encoded segment or that multiple records may be apply to the same set of encoded segments.

At block 710 the video packaging and origination service 120, such through the management component 124, invokes on-demand distribution code. Illustratively, the management component 124 can invoke individual task or execution of on-demand code to effect the transmission of a single encoded segment to an identified set of media endpoints 126. The invocation of the on-demand code can be responsive to the completion of the encoding process, the transmission of an encoded content segment to a storage location 127, or responsive to other established criteria. The on-demand code can be invoked for a single processing in a manner to make dynamic management of distribution more efficient, although it may not necessarily be required. The invocation of the on-demand code will be illustrative managed by the on-demand service provider environment 170.

At decision block 712, a test is conducted to determine if the content to be encoded includes additional segments. If so, routine 700 returns to block 702 to process the next segment to be encoded. Alternatively, routine 700 terminates at block 714.

Figure 8:
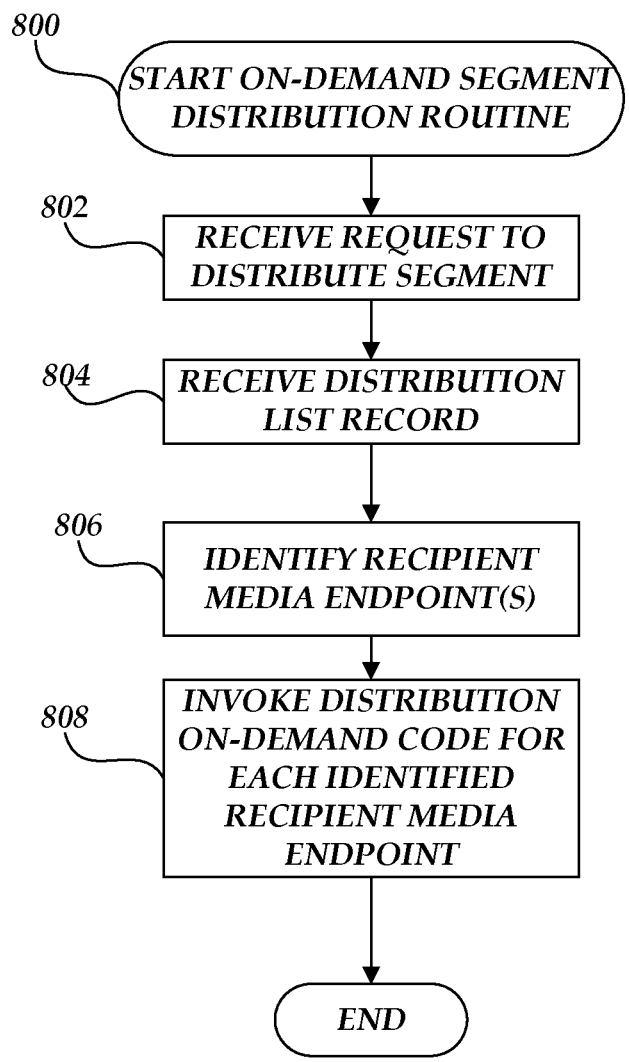
FIG. 8 is a flow diagram illustrative of on-demand encoded segment distribution routine implemented by a video packaging and origination system in accordance with some embodiments.

Turning now to FIG. 8, a routine 800 for implementing an on-demand encoded content segment distribution routine will be described. Illustratively, routine 800 will be described with regard to implementation by a computing device associated with the on-demand service provider environment 170 as described herein. At block 802, the on-demand service provider environment 170 receives the request to distribute a segment. As previously described, in one embodiment, the invocation of the on-demand code may be responsive to the completion of the encoded process.

At block 804, the on-demand service provider environment 170 receives the distribution information. Illustratively, video packaging and origination service 120 transmits or otherwise makes available the distribution list applying to the encoded segment that is the subject of the on-demand code. For example, the on-demand service provider environment 170 can access or receive individual database records (or information from the individual record). Such transmission/distribution can be facilitated as part of the call to invoke the on-demand code or as a separate communication.

At block 806, the on-demand service provider environment, executing the on-demand code, identifies the set of media endpoints for distribution of the encoded content segment. Illustratively, the distribution information includes identification information and any other required information for facilitating the transmission of encoded content segments from the storage location 127 to a respective media endpoint 126. At block 808, the on-demand service provider environment 170 invokes additional on-demand code for each identified recipient media endpoint 126. As described above, the additional on-demand code causes individual transmission of the segment to a respective media endpoint. Routine 800 terminates at block 810.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to transmit content comprising:
one or more computing devices associated with a video packaging and origination service, wherein the video packaging and origination service is configured to:
receive content to be encoded according to an encoding profile;
receive first distribution information identifying a set of media endpoints for receiving encoded content segments;
encode the received content into a plurality of encoded segments;
store the plurality of encoded segment in a data store;
update a database with one or more records corresponding to the received distribution information identifying the set of media endpoints; and
for individual encoded segments, invoke first on-demand code for distributing encoded segments from the data store;
one or more computing devices associated with the first on-demand code for distributing encoded segments from the data store, wherein the one or more computing devices associated with the first on-demand code are associated with an on-demand service that is configured to:
receive a request to distribute individual encoded content segments;
obtain a record from the one or more records in the database, the record identifying the set of media endpoints; and
for individual media endpoints in the set of media endpoints, invoke second on-demand code for causing a transmission of the encoded content segment from the data store to an individual media endpoint; and
one or more computing devices associated with the second on-demand code for causing a transmission of the encoded content segment from the data store to the individual media endpoint, wherein the one or more computing devices associated with the second on-demand code are associated with the on-demand service that is further configured to:
obtain a request to transmit the individual encoded content segments to an identified media endpoint; and
cause transmission of the individual encoded content segment from the data store to the identified media endpoint;
wherein the video packaging and origination service is configured to manage dynamic distribution of the encoded segments and the on-demand service is configured to manage invocation of the first and second on-demand code to distribute the encoded segments.

2. The system of claim 1, wherein the video packaging and origination service is further configured to:
receive an update to the first distribution information identifying the set of media endpoints for receiving the encoded content segments; and
update the database with the received update.

3. The system of claim 2, wherein a first encoded segment of the plurality of encoded segments corresponds to a first entry in the database and wherein a second encoded segment of the plurality of encoded segments corresponds to the first entry in the database.

4. The system of claim 1, wherein the video packaging and origination service is further configured to:
receive additional content to be encoded;
receive second distribution information identifying a second set of media endpoints for receiving the additional content to be encoded; and
update the database with an entry corresponding to the second distribution information.

5. The system of claim 4, wherein the first and second distribution information are different.

6. A computer-implemented method to manage delivery of encoded content segments comprising:
  receiving, at a video packaging and origination service, content to be encoded;
  receiving, at a video packaging and origination service, distribution information identifying a set of media endpoints for receiving encoded content segments;
  updating, at a video packaging and origination service, a database with one or more records corresponding to the received distribution information identifying the set of media endpoints; and
  for individual encoded segments, invoking, at a video packaging and origination service, first on-demand code for distributing, with an on-demand service, encoded segments from a data store and causing the on-demand service to invoke second on-demand code for causing a transmission of the encoded segments from the data store to individual media endpoints, wherein the video packaging and origination service is configured to manage dynamic distribution of the encoded segments and the on-demand service is configured to manage invocation of the first and second on-demand code to distribute the encoded segments.

7. The computer-implemented method of claim 6 further comprising encoding the received content into a plurality of encoded segments.

8. The computer-implemented method of claim 7 further comprising storing the plurality of encoded segment in the data store.

9. The computer-implemented method of claim 8, wherein invoking the first on-demand code for distributing encoded segments from the data store includes invoking the first on-demand code for distributing encoded segments from the data store responsive to storing an encoded content segment in the data store.

10. The computer-implemented method of claim 8 further comprising:
  receiving an update to the distribution information identifying the set of media endpoints for receiving encoded content segments; and
  updating the database with the received update.

11. The computer-implemented method of claim 10, wherein receiving the update to the distribution information identifying the set of media endpoints for receiving encoded content segments includes receiving the update to the distribution information in accordance with an application protocol interface.

12. The computer-implemented method of claim 10, wherein a first encoded segment of the plurality of encoded segments corresponds to a first entry in the database and wherein a second encoded segment of the plurality of encoded segments corresponds to the first entry in the database.

13. The computer-implemented method of claim 10, wherein a first encoded segment of the plurality of encoded segments corresponds to a first entry in the database and wherein a second encoded segment of the plurality of encoded segments corresponds to a second entry in the database.

14. The computer-implemented method of claim 10, wherein the set of media endpoints are associated with individual distribution zones.

15. The computer-implemented method of claim 6 further comprising:
  receiving additional content to be encoded;
  receiving second distribution information identifying a second set of media endpoints for receiving the additional content to be encoded; and
  updating the database with an entry corresponding to the second distribution information.

16. The computer-implemented method of claim 15 further comprising:
  receiving second additional content to be encoded; and
  updating the database with a previous entry corresponding to the distribution information.

17. A computer-implemented method to manage delivery of encoded content segments comprising:
  receiving, at a video packaging and origination service, content to be encoded into a plurality of encoded content segments;
  receiving, at a video packaging and origination service, distribution information identifying a first set of media endpoints for receiving a first encoded content segment;
  updating, at a video packaging and origination service, a database with a first record corresponding to the received distribution information identifying the first set of media endpoints;
  invoking, at a video packaging and origination service, first on-demand code for distributing, with an on-demand service, the first encoded content segment from a data store and causing the on-demand service to invoke second on-demand code to cause a transmission of the first encoded content segment according to the first record in the database;
  receiving, at a video packaging and origination service, distribution information identifying a second set of media endpoints for receiving a second encoded content segment;
  updating, at a video packaging and origination service, the database with a second record corresponding to the received distribution information identifying the second set of media endpoints; and
  invoking, at a video packaging and origination service, the first on-demand code for distributing, with the on-demand service, the second encoded content segment from the data store and causing the on-demand service to invoke the second on-demand code causing a transmission of the second encoded content segment according to the second record in the database, wherein the video packaging and origination service is configured to manage dynamic distribution of the encoded segments and the on-demand service is configured to manage invocation of the first and second on-demand code to distribute the encoded segments.

18. The computer-implemented method of claim 17 further comprising storing the plurality of encoded segments in the data store.

19. The computer-implemented method of claim 17, wherein the first and second sets of media endpoints correspond to different distribution zones.

20. The computer-implemented method of claim 17, wherein receiving distribution information identifying the second set of media endpoints for receiving the second encoded content segment includes receiving the distribution information from a content provider.

21. The computer-implemented method of claim 17 further comprising encoding the received content into the plurality of encoded segments.

22. The computer-implemented method of claim 17, wherein updating the database with the second record corresponding to the received distribution information includes replacing the first record corresponding to the received distribution information.

23. The computer-implemented method of claim 17, wherein updating the database with the second record corresponding to the received distribution information includes designating the first record corresponding to the received distribution information as not applicable.

\* \* \* \* \*